US011522807B2

(12) United States Patent
Ros-Giralt et al.

(10) Patent No.: US 11,522,807 B2
(45) Date of Patent: Dec. 6, 2022

(54) COMPUTATIONALLY EFFICIENT ANALYSIS AND MANAGEMENT OF SYSTEMS MODELED AS NETWORKS

(71) Applicant: Reservoir Labs, Inc., New York, NY (US)

(72) Inventors: Jordi Ros-Giralt, Newport Beach, CA (US); Noah Amsel, New York, NY (US); Sruthi Yellamraju, Germantown, MD (US); Richard A. Lethin, New York, NY (US)

(73) Assignee: Reservoir Labs, Inc., San Diego, CA (US)

( * ) Notice: Subject to any disclaimer, the term of this patent is extended or adjusted under 35 U.S.C. 154(b) by 0 days.

(21) Appl. No.: 17/373,261

(22) Filed: Jul. 12, 2021

(65) Prior Publication Data

US 2022/0078130 A1 Mar. 10, 2022

Related U.S. Application Data

(60) Provisional application No. 63/076,629, filed on Sep. 10, 2020.

(51) Int. Cl.
*H04L 47/762* (2022.01)
*H04L 47/74* (2022.01)
*H04L 47/80* (2022.01)
*H04L 47/78* (2022.01)

(52) U.S. Cl.
CPC .......... *H04L 47/745* (2013.01); *H04L 47/748* (2013.01); *H04L 47/762* (2013.01); *H04L 47/781* (2013.01); *H04L 47/801* (2013.01)

(58) Field of Classification Search
CPC ... H04L 47/745; H04L 47/748; H04L 47/762; H04L 47/781; H04L 47/801; H04L 47/26; H04L 47/17
See application file for complete search history.

(56) References Cited

U.S. PATENT DOCUMENTS

| | | | |
|---|---|---|---|
| 11,398,984 B1* | 7/2022 | Ros-Giralt | .......... H04L 41/0893 |
| 2004/0261116 A1* | 12/2004 | Mckeown | ........... H04L 41/0631 |
| | | | 725/109 |
| 2007/0027801 A1* | 2/2007 | Botzer | .................. G06Q 40/04 |
| | | | 705/39 |
| 2014/0215077 A1* | 7/2014 | Soudan | ................... H04L 47/11 |
| | | | 709/226 |
| 2016/0269247 A1* | 9/2016 | Chakradhar | ............ H04L 67/12 |
| 2018/0343168 A1* | 11/2018 | Hayashi | .............. H04L 47/2483 |
| 2022/0029925 A1* | 1/2022 | Gandhi | ............... H04L 43/0894 |

* cited by examiner

*Primary Examiner* — Aftab N. Khan
(74) *Attorney, Agent, or Firm* — Seyfarth Shaw LLP

(57) ABSTRACT

A technique is described for quantifying a change in a system parameter in response to a perturbation of another system parameter. The technique identifies a region of influence of the perturbation and limits the propagation of the perturbation to the identified region.

24 Claims, 18 Drawing Sheets

Algorithm 1 ComputeBS($\mathcal{N} = \langle \mathcal{L}, \mathcal{F}, \{c_l, \forall l \in \mathcal{L}\}\rangle$)

1: $\mathcal{L} :=$ Set of links in the input network;
2: $\mathcal{F} :=$ Set of flows in the input network;
3: $\mathcal{F}_l :=$ Set of flows going through link $l$;
4: $c_l :=$ Capacity of link $l$;
5: $\mathcal{B} :=$ Set of bottleneck links;
6: $r_f :=$ Rate of flow $f$;
7: $\mathcal{L}^k :=$ Set of unresolved links at iteration $k$;
8: $\mathcal{C}^k :=$ Set of resolved flows at iteration $k$;
9: $\mathcal{L}^0 = \mathcal{L}; \mathcal{C}^0 = \emptyset; k = 0;$
10: $E = \emptyset;$
11: while $\mathcal{C}^k \neq \mathcal{F}$ do
12:     $s_l^k = (c_l - \sum_{\forall f \in \mathcal{C}^k \cap \mathcal{F}_l} r_f) / |\mathcal{F}_l \setminus \mathcal{C}^k|, \forall l \in \mathcal{L}^k;$
13:     $a_l^k = \min\{s_{l'}^k \mid \mathcal{F}_{l'} \cap \mathcal{F}_l \neq \emptyset, \forall l' \in \mathcal{L}^k\}, \forall l \in \mathcal{L}^k;$
14:     for $l \in \mathcal{L}^k, s_l^k = a_l^k$ do
15:         $r_f = s_l^k, \forall f \in \mathcal{F}_l \setminus \mathcal{C}^k;$
16:         $E = E \cup \{(l, f), \forall f \in \mathcal{F}_l \setminus \mathcal{C}^k\};$
17:         $E = E \cup \{(f, l'), \forall f \in \mathcal{F}_l \setminus \mathcal{C}^k \text{ and } \forall l' \in \mathcal{L}_f \mid s_{l'}^k \neq a_{l'}^k\};$
18:         $\mathcal{L}^k = \mathcal{L}^k \setminus \{l\};$
19:         $\mathcal{C}^k = \mathcal{C}^k \cup \{f, \forall f \in \mathcal{F}_l\};$
20:     end for
21:     $\mathcal{L}^{k+1} = \mathcal{L}^k; \mathcal{C}^{k+1} = \mathcal{C}^k;$
22:     $k = k + 1;$
23: end while
24: $\mathcal{B} = \mathcal{L} \setminus \mathcal{L}^k; \mathcal{V} = \mathcal{B} \cup \mathcal{F}; s_l = s_l^k, \forall l \in \mathcal{B};$
25: $\mathcal{G} = (\mathcal{V}, E);$
26: return $(\mathcal{G}, \{s_l, \forall l \in \mathcal{L}\}, \{r_f, \forall f \in \mathcal{F}\});$

FIG. 3

Algorithm 2 FastComputeBS($\mathcal{N} = (\mathcal{L}, \mathcal{F}, \{c_l, \forall l \in \mathcal{L}\})$)

1: $\mathcal{V} = \emptyset; E = \emptyset; r_f = \infty, \forall f \in \mathcal{F};$
2: for $l \in \mathcal{L}$ do
3:     $a_l = c_l;$     # available capacity
4:     $s_l = a_l/|\mathcal{F}_l|;$     # fair share
5:     MinHeapAdd(key = $s_l$, value= $l$);
6: end for
7: while $\mathcal{F} \not\subseteq \mathcal{V}$ do
8:     $l$ = MinHeapPop();
9:     for $f \in \mathcal{F}_l$ such that $r_f \geq s_l$ do
10:         $E = E \cup \{(l, f)\};$
11:         if $f \notin \mathcal{V}$ then
12:             $r_f = s_l;$
13:             $\mathcal{V} = \mathcal{V} \cup \{f\};$
14:             for $l' \in \mathcal{L}_f$ such that $r_f < s_{l'}$ do
15:                 $E = E \cup \{(f, l')\}$
16:                 $a_{l'} = a_{l'} - s_l;$
17:                 $s_{l'} = a_{l'}/|\mathcal{F}_{l'} \setminus \mathcal{V}|;$
18:                 MinHeapUpdateKey(value = $l'$, newKey = $s_{l'}$);
19:             end for
20:         end if
21:     end for
22:     $\mathcal{V} = \mathcal{V} \cup \{l\};$
23: end while
24: return $(\mathcal{G} = (V, E), \{s_l, \forall l \in \mathcal{L}\}, \{r_f, \forall f \in \mathcal{F}\});$

FIG. 4

Algorithm 3 BruteGrad($\mathcal{N} = \langle \mathcal{L}, \mathcal{F}, \{c_l, \forall l \in \mathcal{L}\}\rangle, l^* \in \mathcal{L}$)

1: $(\mathcal{G}, \{s_l\}, \{r_f\}) = ComputeBS((\mathcal{L}, \mathcal{F}, \{c_l\}))$
2: $c'_l = \begin{cases} c_l + \delta & l = l^* \\ c_l & o.w. \end{cases}, \forall l \in \mathcal{L}$
3: $(\mathcal{G}', \{s'_l\}, \{r'_f\}) = ComputeBS((\mathcal{L}, \mathcal{F}, \{c'_l\}))$
4: return $\dfrac{\sum_{f \in \mathcal{F}} r'_f - r_f}{\delta}$

FIG. 5

Algorithm 4 ForwardGrad($\mathcal{N} = \langle \mathcal{L}, \mathcal{F}, \{c_l, \forall l \in \mathcal{L}\}\rangle, l^* \in \mathcal{L}$)

1: $d_s = 0 \quad \forall s \in \mathcal{L} \cup \mathcal{F}$
2: $d_{l^*} = 1$
3: MinHeapAdd(key $= \langle r_{l^*}, d_{l^*}/|\text{children}(l^*, \mathcal{G})|\rangle$, value $= l^*$)
4: $V = \emptyset$     # the set of previously visited nodes
5: repeat
6:   $l$ = MinHeapPop()
7:   $V = V \cup \{l\}$
8:   for $f \in [\text{children}(l, \mathcal{G})]$ do
9:     $d_f = d_l/|\text{children}(l, \mathcal{G})|$
10:    for $l' \in \text{children}(f, \mathcal{G}) \setminus V$ do
11:      $d_{l'} = d_{l'} - d_f$
12:      MinHeapAdd(key $= \langle r_{l'}, d_{l'}/|\text{children}(l', \mathcal{G})|\rangle$, value $= l'$)
13:    end for
14:  end for
15: until MinHeapEmpty()
16: return $\sum_{f \in \mathcal{F}} d_f$

FIG. 6A

Algorithm 5 ForwardGrad($\mathcal{N} = \langle \mathcal{L}, \mathcal{F}, \{c_l, \forall l \in \mathcal{L}\}\rangle, f^* \in \mathcal{F}$)

1: $d_s = 0 \quad \forall s \in \mathcal{L} \cup \mathcal{F}$
2: $d_{f^*} = 1$
3: $V = \emptyset$     # the set of previously visited nodes
4: Let $b \in \mathcal{L}$ be a link such that $f^* \in \text{children}(b, \mathcal{G})$    # b is the bottleneck link of $f^*$
5: Remove edge from $b$ to $f^*$ in $\mathcal{G}$
6: for $l \in \text{children}(f^*, \mathcal{G}) \cup \{b\}$ do
7:     $d_l = d_l - d_{f^*}$
8:     MinHeapAdd(key $=(r_l, d_l/|\text{children}(l, \mathcal{G})|)$, value $=l$)
9: end for
10: repeat
11:     $l = $ MinHeapPop()
12:     $V = V \cup \{l\}$
13:     for $f \in [\text{children}(l, \mathcal{G})]$ do
14:       $d_f = d_l/|\text{children}(l, \mathcal{G})|$
15:       for $l' \in \text{children}(f, \mathcal{G}) \setminus V$ do
16:         $d_{l'} = d_{l'} - d_f$
17:         MinHeapAdd(key $=(r_{l'}, d_{l'}/|\text{children}(l', \mathcal{G})|)$, value $=l'$)
18:       end for
19:     end for
20: until MinHeapEmpty()
21: return $\sum_{f \in \mathcal{F}} d_f$

FIG. 6B

COMPUTATIONALLY EFFICIENT ANALYSIS AND MANAGEMENT OF SYSTEMS MODELED AS NETWORKS

CROSS-REFERENCE TO RELATED APPLICATIONS

This application claims priority to and benefit of U.S. Provisional Patent Application No. 63/076,629, titled "Computing Bottleneck Structures at Scale for High-Precision Network Performance Analysis," filed on Sep. 10, 2020, the entire contents of which are incorporated herein by reference.

GOVERNMENT LICENSE RIGHTS

This invention was made with government support under Contract No. DE-SC0019523 awarded by the U.S. Department of Energy (DoE). The government has certain rights in the invention.

FIELD

This disclosure generally relates to analysis, design, and optimization of systems and, in particular, to analysis of cascading effect of a perturbation in a system parameter.

BACKGROUND

Congestion control is an important component of high-performance data networks, that has been intensely researched for decades. Since 1988, when Van Jacobson proposed the first congestion control algorithm, the analysis of bottlenecks in data networks has been studied. Van Jacobson's algorithm is believed to have saved the Internet from congestion collapse. One of the main goals of congestion control is to distribute the limited bandwidth of each link in the network among the various data flows that need to traverse it. Congestion control algorithms have a dual mandate of maximizing network utilization while also ensuring fairness among competing flows. The conventional view of this problem assumes that the performance of a flow is solely determined by its bottleneck link—that is, the link in its path that allocates the least bandwidth to it.

More specifically, much of the research during the past three decades has been premised on the notion that a flow's performance is uniquely determined by the capacity of its bottleneck and the communication round trip time of its path. This view has lead to dozens of congestion-control algorithms based on characterizing (whether implicitly or explicitly) the performance of each flow's bottleneck. Well-known works in this vein include BBR, Cubic, and Reno. These standard congestion control algorithms in the TCP protocol generally operate at the level of individual flows, the transmission rates of which are set separately by each sender. While these algorithms have been crucial to the success of large-scale communication networks like the Internet, they continue to treat bottlenecks as independent elements and do not consider their interactions or dynamic nature.

One line of research has taken a more global view by modeling networks as instances of multi-commodity flow problems. The classical formulation of these problems is altered to include a notion of fairness between competing flows. This approach has been applied to routing and load balancing problems under the assumption of multi-path routing; algorithms typically involve iteratively solving a series linear programs and adjusting the constraints. This approach has a high computational complexity that makes scaling difficult, despite algorithmic tricks to mitigate the cost. Moreover, this framework is somewhat brittle; it obscures the roles played by individual elements in determining network behavior, lacking, for example, an equivalent notion to link and flow derivatives.

SUMMARY

Treating bottlenecks as independent elements and not considering their interactions or dynamic nature makes it difficult to consider the network (any complex system, in general) as a whole, since it hides the complex ripple effects that changes in one part of the network (or system) can exert on the other parts. The Theory of Bottleneck Structures, was introduced in U.S. patent application Ser. No. 17/181,862, titled "Network Analysis and Management Based on a Quantitative Theory of Bottleneck Structures," filed on Feb. 22, 2021 (the "'862 application") and also in U.S. patent application Ser. No. 16/580,718, titled "Systems and Methods for Quality of Service (Qos) Based Management of Bottlenecks and Flows in Networks," filed on Sep. 24, 2019 (the "'718 application"). Each of the '862 application and the '718 application is incorporated herein by reference in its entirety, provide a deeper understanding of congestion controlled networks. They describe how the performance of each link and data flow depends on that of the others, forming a latent dependency structure that can be modeled as a directed graph. Armed with this model, network operators can make accurate, quantitative predictions about network behavior, including how local changes like link upgrades, traffic shaping or flow routing will propagate, interact with one another, and affect the performance of the network as a whole. The Theory of Bottleneck Structures can be used to reason about a large variety of network optimization problems, including traffic engineering, congestion control, routing, capacity planning, network design, and resiliency analysis.

One of the goals of the discussion below is to demonstrate that the insights of the Theory of Bottleneck Structures can be applied at scale to production networks. Previous work introduced a software system that implemented the two core operations of constructing the bottleneck structure graph and computing derivatives of network performance with respect to parameters like link capacities and traffic shapers. However, this system was tested on relatively small networks, and its performance was not benchmarked. In this work, we demonstrate a new high-performance software package designed to scale these two core operations to production-size networks. Using real production NetFlow logs from ESnet—the Department of Energy's high-performance network connecting the US National Laboratory system—we performed extensive benchmarks to compare the two packages and characterize their scalability. We confirm that, with the right implementation, bottleneck structures can be used to analyze large networks in practice, thus unlocking a powerful new framework to understand performance in production environments.

Accordingly, in one aspect a method is provided for determining a change in a first system parameter (e.g., flow throughput, storage or processing latency, etc.) in response to an incremental change in a second system parameter (e.g., available link capacity, processing capacity, etc. The method includes performing by a processor the step of generating a bottleneck structure representing the system. The bottleneck structure includes several elements, where each element represents a respective system resource or a respective user of one or more system resources. The bottleneck structure has several levels. Respective elements at successive levels indicate increasing resource utilization, resource availability, or resource requirement. For example, the flow rates or processing rates at an upper level are typically less than the flow or processing rates at a lower level.

The method also includes receiving an element identifier identifying one of the several elements, and selecting elements that are directly impacted (e.g., those that may be represented as immediate successors or children of the identified element, if the bottleneck structure is a graph), by a change in a parameter associated with the identified element. In addition, the method includes determining, for each selected element, a respective initial incremental change in a respective associated parameter. The method further includes recursively propagating the respective initial incremental changes through the bottleneck structure, and deriving a change in the first system parameter by accumulating respective changes in respective parameters associated with elements of a specified type of the bottleneck structure.

In some embodiments, the several elements include one or more resource elements, where a resource element represents a resource parameter of a corresponding system resource. Additionally or in the alternative, the several elements may include one or more user elements, where a user element represents a utilization parameter of a corresponding user (also referred to as demand source) of the system. The parameter associated with the identified element may include resource utilization, resource availability, or resource requirement. Likewise, the parameter associated with one of the selected elements may include resource utilization, resource availability, or resource requirement.

The identified element may include a resource element or a user element, and the directly impacted elements may also include resource elements or a user elements. In some embodiments, the several elements include one or more resource elements of a first type, where a resource element of the first type represents a resource parameter of a corresponding system resource of the first type. Additionally, the several elements may include one or more resource elements of a second type, where a resource element of the second type represents a resource parameter of a corresponding system resource of the second type.

In some embodiments, the several elements include one or more link elements corresponding, respectively, to one or more links in a network. The network may be a data network, or a network representation of a system. The several elements also include one or more flow elements corresponding, respectively, to one or more network flows. Flow elements at a first level may correspond to flows having smaller flow rates than rates of flows corresponding to flow elements at a second level. The element identifier identifies a link element, and the first system parameter includes total network flow throughput.

In some embodiments, the step of recursively propagating includes storing in a heap structure identifiers of one or more of the several elements. The heap structure may include two-key heap structure, where: a first key represents a base value of a parameter associated with an element of the bottleneck structure, and a second key represents a increment to the base value. The increment can be positive, zero, or negative. Recursively propagating the respective initial incremental changes through the bottleneck structure may include propagating a first initial incremental change through the bottleneck structure at a first processor, and propagating, in parallel, a second initial incremental change through the bottleneck structure at a second processor. In some embodiments, the step of recursively propagating the respective initial incremental changes through the bottleneck structure may include applying a propagation rule corresponding to a type of the selected elements.

In another aspect, a computing apparatus is provided for determining a change in a first system parameter of a system in response to an incremental change in a second system parameter. The system includes a first processor and a first memory in electrical communication with the first processor. The first memory includes instructions that, when executed by a processing unit that includes one or more computing units, where one of such computing units may include the first processor or a second processor, and where the processing unit is in electronic communication with a memory module that includes the first memory or a second memory, program the processing unit to: generate a bottleneck structure representing the system.

The bottleneck structure includes several elements, where each element represents a respective system resource or a respective user of one or more system resources. The bottleneck structure has several levels. Respective elements at successive levels indicate increasing resource utilization, resource availability, or resource requirement. For example, the flow rates or processing rates at an upper level are typically less than the flow or processing rates at a lower level.

In addition, the instructions program the processing unit to receive an element identifier identifying one of the several elements, and to select elements that are directly impacted (e.g., those that may be represented as immediate successors or children of the identified element, if the bottleneck structure is a graph), by a change in a parameter associated with the identified element. The instructions also program the processing unit to determine, for each selected element, a respective initial incremental change in a respective associated parameter. Moreover, the instructions program the processing unit to propagate recursively the respective initial incremental changes through the bottleneck structure, and to derive a change in the first system parameter by accumulating respective changes in respective parameters associated with elements of a specified type of the bottleneck structure.

In various embodiments, the instructions can program the processing unit to perform one or more of the method steps described above.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the invention. In the drawings:

FIGS. 3 and 4 show algorithms for generating a bottleneck structure for a network/system, according to some embodiments;

FIG. 5 shows an algorithm for computing a derivative, or a change resulting in one system parameter due to a change in another system parameter, where the computation relies on regeneration of the bottleneck structure, according to some embodiments;

FIGS. 6A and 6B show computationally efficient algorithms for computing a derivative, or a change resulting in one system parameter due to a change in another system parameter, where the computation relies on only one generation of the bottleneck structure, and avoids regeneration, according to some embodiments;

DETAILED DESCRIPTION

1 Introduction

Figure 1:
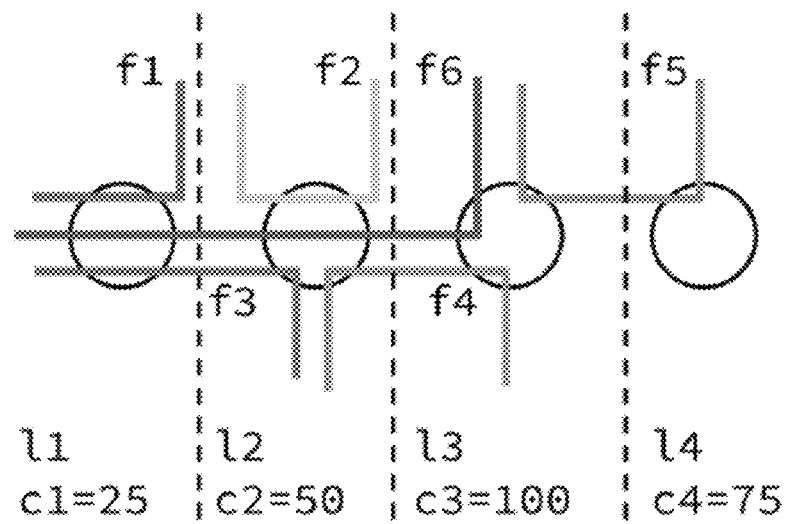
FIG. 1 depicts an example network configuration.

The existence of complex interactions among bottlenecks has not gone completely unnoticed in the research community. For instance, it has been recognized that the situation may become more complicated as the number of links increases because, as flows are added or terminated, the fair-share rates of links generally change. Accordingly, the bottleneck links for flows may change, which may in turn affect other bottleneck links, and so on, potentially propagating through all the links in a network.

No solution to this problem was offered, however, until we first did in the '862 application, which is incorporated by reference in its entirety. This work introduced the concept of latent bottleneck structures and used a directed graph to model them. It also introduced the first algorithm to compute the bottleneck structure, which appears in the discussion below as ComputeBS. We describe herein techniques for generating such bottleneck structures in a computationally efficient manner, and also using them for system analysis in an efficient manner, taking advantage of the ordered nature of the bottleneck structures, so that these structures can be used to analyze and optimize real-life systems.

We provided a software package for computing bottleneck structures and using them to analyze networks (systems, in general). A Python implementations of the ComputeBS and BruteGrad algorithms was provided, along with functionality for reading sFlow logs and performing simulations. We use their package as a baseline in the discussion below. Various implementations of the FastGrad algorithm can improve computing efficiency by minimizing processor load and/or required memory when used to analyze large networks and systems.

A benchmark of the techniques described below to compute bottleneck structures is also provided, demonstrating that, when efficiently implemented, these techniques can scale to support the size of real production networks (systems, in general). This result confirms the practical usefulness of bottleneck structures as a framework to help network operators understand and improve performance with high-precision.

The discussion below is organized as follows. In Section 2, we provide a brief introduction to bottleneck structures and summarize the core algorithms that are the subject of the presented benchmarks. Section 3 describes the data set and reports the benchmarks for the computation of bottleneck structures (Section 3.2) and link gradients (Section 3.3). Section 4 discusses integration of the benchmarked algorithms in real production networks and systems. Application of techniques described herein to complex systems is described in Section 5. Section 6 presents conclusions.

2 Theoretical Background and Algorithms

2.1 Introduction to Bottleneck Structures

While describing the mathematics of bottleneck structures is not the focus of this paper, this section provides an example that will give the reader some intuition for the meaning and analytical capabilities of a bottleneck structure.

Figure 2:
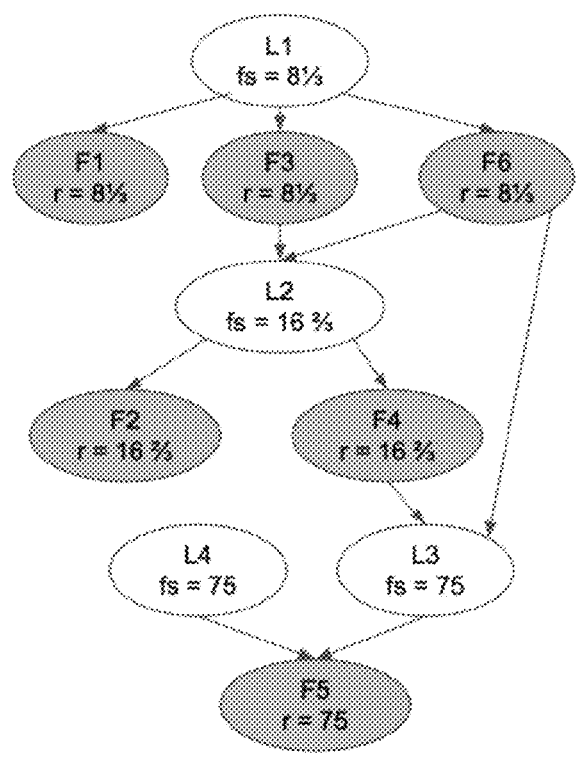
FIG. 2 is a bottleneck structure of the network shown in FIG. 1, according to one embodiment.

Example 1: Consider a network shown in FIG. 1, having four links $\{l_1, l_2, l_3, l_4\}$ in which there are six active data flows $\{f_1, \ldots, f_6\}$. The capacity of each link $(c_1, \ldots, c_4)$ and the route of each flow is shown in FIG. 1. (We do not consider the network's topology, just the set of links in each flow's route.) The resulting bottleneck structure of this example network is shown in FIG. 2. It is represented by a directed graph in which:

1) There exists one vertex for each flow (plotted in gray) and each link (plotted in white) of the network.
2) a) If flow f is bottlenecked at link l, then there exists a directed edge from l to f.
   b) If flow f traverses link l but is not bottlenecked by it, then there exists a directed edge from f to l.

Intuitively, the bottleneck structure captures the influences that links and flows in the network exert on each other. Consider link 1. Three flows traverse it, and it has a capacity of 25. Thus, it allocates 25/3=8⅓ each to flows 1, 3, and 6. If the capacity of link 1 were to change, the rates of these three flows would change too. This relationship is reflected in the directed edges from node L1 to nodes F1, F3, and F6. Flow 3 also traverses link 2, but since link 2 has more bandwidth available than link 1, flow 3 is not bottlenecked there. The leftover bandwidth not used by flow 3 is picked up by other flows that use link 2—that is, by flow 2 and flow 4. So if flow 3's rate were to change, their rates would be affected too. This relationship is reflected in the directed paths F3→L2→F2 and F3→L2→F4. The reverse is not true. If L2's rate were perturbed by a small amount, F3's performance would not be affected, and indeed, no path from L2 to F3 exists. It has been proven that the performance of a flow f is influenced by the performance of another flow f' if and only if there exists a directed path in the bottleneck structure graph from flow f''s bottleneck link to flow f.

The bottleneck structure allows us to easily visualize relationships between network elements. We can also quantify these relationships. Consider the congestion control algorithm to be a function that takes the network conditions as input and assigns a transmission rate to each flow as output. A key insight stemming from the Theory of Bottleneck Structures is that many seemingly separate questions in network management can be unified under a single quantitative framework by studying the derivatives of this function. For example, letting $c_1$ be the capacity of link 1 and $r_3$ be the rate of flow 1, we have:

$$\frac{dr_3}{dc_1} = \frac{1}{3}$$

since each additional unit of capacity added at link 1 will be distributed evenly among the three flows which are bottlenecked there.

Derivatives with respect to flow rates can also be calculated; they represent, for example, the effect of traffic shaping a flow (that is, artificially reducing its rate) on the performance of another flow. In our experiments, we used the capacity $c_l$ of some link l as the independent variable. Derivatives can also be taken of any differentiable function of the rates, not just an individual rate like $r_3$. In the discussion below, we take the dependent variable to be the total throughput of the network, that is, the total rate of all its flows:

$$T = \Sigma_{f \in F} r_f$$

The derivative $$\frac{dT}{dc_l}$$

quantifies how much the total throughput of the network would change if link l were given an infinitesimally higher capacity denoted δ.

It should be noted that the bandwidth allocation function is continuous everywhere, but not technically differentiable. In particular, it is piecewise linear. Thus, while the derivative does not exist at all points, we can study the directional derivative instead. Without loss of generality we use 'derivative' to denote the derivative in the positive direction (δ>0 rather than δ<0 in line 2 of Algorithm 3 discussed below.

The Theory of Bottleneck Structures is a somewhat idealized model of network behavior. In our example, we assumed that flow 3 would experience a rate of 8⅓, but in fact its rate will fluctuate as the congestion control algorithm tries to calibrate it to network conditions, and due to other factors like latency. Nevertheless, our experiments showed that the theoretical flow rates predicted by the bottleneck structure model accurately match the actual transmission rates observed in networks that use popular congestion control algorithms like BBR and Cubic. The Theory of Bottleneck Structures can also be extended; for example, a latent bottleneck structure still exists if a proportional fairness criterion is used to allocate rates instead of max-min fairness. The theory can also be applied to networks that use multipath routing by considering each route to be a separate flow, and optimizing the sum of their bandwidths instead of any individual bandwidth.

2.2 Applications of Bottleneck Structure Analysis

The scientific community has long relied on high-performance networks to store and analyze massive volumes of data. As the collection of scientific data continues to balloon, the importance of designing these networks intelligently and operating them at maximum efficiency will only increase. The analytical power of the Theory of Bottleneck Structures stems from its ability to capture the influences that bottlenecks and flows exert on each other and, in particular, to precisely quantify these influences. This ability can be applied to a wide range of networking problems. For example, taking derivatives of the form $$\frac{dT}{dc_l}$$

is a natural way to study the problem of optimally upgrading the network.

The derivative of the total throughput with respect to the capacity of each link reveals which links should be upgraded to have the maximal impact on the overall performance of a network. Other questions in network design and capacity planning can be addressed using similar techniques. The Theory of Bottleneck Structures also sheds light on flow control problems like routing and traffic engineering. For example, if we want to increase the performance of a certain high priority flow and we know which flows are low priority, we can compute derivatives of the high priority flow's rate to determine which of the low priority flows to traffic shape.

We can also make precise quantitative predictions of how much this intervention would increase performance. Applications also arise in other areas. For example, determining where a given flow is bottlenecked, who controls that bottleneck link, and how other traffic in the network affects the flow can help in monitoring and managing Service-Level Agreements (SLAB). Future work will describe such applications in greater detail, but few are feasible without high-performance algorithms and software for bottleneck structure analysis. One challenge of analyzing networks in practice is that network conditions change from second to second. The need to analyze networks in real time imposes even stricter performance requirements that previous work has failed to meet.

2.3 Constructing Bottleneck Structures

This section describes two algorithms for constructing bottleneck structures. The first corresponds to an improved version of the algorithm proposed in the '862 application. The pseudocode is presented in FIG. 3, Algorithm 1 called ComputeBS.

During each iteration of the main loop, a set of links are resolved, meaning the rates of all flows which traverse them are permanently fixed. This set of links is those whose "fair share value" $s_l$ at that iteration (line 12) is the smallest among all links with which they share a flow (line 13). The rates of all flows traversing link l which have not previously been fixed are set in line 15, and the link and its flows are marked as resolved (line 18 and 19). In addition, the proper directed edges are added to the bottleneck structure graph— from a links to flows which they bottleneck (line 16) and from flows to links that they traverse but that do not bottleneck them (line 17). The algorithm returns the bottleneck structure $\mathcal{G}=\langle V,E\rangle$, the link parameters $\{s_l, \forall l \in \mathcal{L}\}$ and the predicted flow transmission rates $\{r_f, \forall f \in \mathcal{F}\}$.

This procedure includes logic to build the graph representation of the bottleneck structure. Its computational complexity is $O(H \cdot |\mathcal{L}|^2 + |\mathcal{L}| \cdot |\mathcal{F}|)$, where $\mathcal{L}$ is the set of links, $\mathcal{F}$ is the set of flows and H is the maximum number of links traversed by any flow. Applying ComputeBS( ) to the network configuration shown in FIG. 1 can yield in the bottleneck structure shown in FIG. 2. It should be understood that a graph is only one type of data structure used to represent a bottleneck structure. Other suitable structures, that can express dependences between links and flows (resources and users, in general, as discussed below), may also be used. Examples of such structures include lists, linked lists, vectors, etc.

We next describe FastComputeBS (FIG. 4, Algorithm 2), an improved algorithm for computing bottleneck structures with an asymptotically faster run time and improved computational and memory efficiencies than ComputeBS. This algorithm resolves links one-by-one, but unlike ComputeBS, it stores the links in a heap data structure sorted by the amount of bandwidth they can allocate to flows which traverse them. This allows the algorithm to resolve links in the proper order without searching through the entire set of links at each iteration, effectively skipping the expensive min{ } computation of Algorithm 1 (line 13). FastComputeBS can reduce the asymptotic run time of computing the bottleneck structure to $O(|E| \cdot \log|\mathcal{L}|)$, where $|E|$ is the number of edges in the bottleneck structure and $|\mathcal{L}|$ is the number of links. By definition, there is one edge for each pair of a flow and a link it traverses. Thus, the run time is quasilinear in the size of the input.

2.4 Computing Link Gradients

This section describes two algorithms for computing derivatives in a network (and, in general, in a system). Algorithm 3 shown in FIG. 5 calculates the derivative $$\frac{\partial T}{\partial c_{l^*}}$$

by perturbing the capacity of a selected link l* by an infinitesimally small constant δ. We then measure the change produced in the total throughput, and divide by δ to calculate the rate of change. Since the bandwidth allocation function is piecewise linear, this slope is exactly the derivative $$\frac{\partial T}{\partial c_{l^*}}.$$

While this method is accurate, it requires recomputing the rates $r_f$, from scratch, which is an expensive operation. Thus, we call this algorithm BruteGrad. We can improve the algorithm somewhat by replacing ComputeBS in lines 1 and 3 with FastComputeBS. We call this improved algorithm BruteGrad++. While asymptotically faster than BruteGrad, it is still slow if many derivatives need to be computed.

In contrast, Algorithm 4 (ForwardGrad) shown in FIG. 6A uses the information captured in the bottleneck structure graph itself to speed up the computation of the derivative. A key insight for this algorithm is that once the bottleneck structure has been computed, it can be reused to calculate different derivatives without the need to recompute the bottleneck structure for each derivative, as in the BruteGrad algorithm. The algorithm is inspired by forward mode automatic differentiation ("Forward Prop"), an algorithm for finding the derivative of a complicated expression that repeatedly applies the chain rule to larger and larger pieces of the expression. In our case, the bottleneck structure is related to a computation graph of a complicated expression, since a flow's rate is determined by its bottleneck links, which in turn depend on its predecessors in the bottleneck structure.

But the relationship fails in two significant ways. First a flow's rate can be affected by a change in its sibling's rate that frees up extra bandwidth in their shared parent, even if the parent's overall capacity stays the same. Second, a flow's rate can fail to change when its parent link changes, if it also has another parent bottleneck link that does not change. Thus, while the algorithm begins with the independent variable and propagates the derivatives forward according to the chain rule, it sometimes needs to backtrack in the graph to correct for these cases. Still, the algorithm is a significant improvement on BruteGrad. It only requires visiting each link or flow at most once, and it only visits nodes which are affected by changes in l*. This means that ForwardGrad has a much lower asymptotic complexity than BruteGrad. In the extreme case, l* could have no descendants in the bottleneck structure, and the algorithm will terminate immediately.

In Algorithm 4, l* represents a link for which the capacity may change infinitesimally (e.g., a small amount δ). When l* represents a link, in line 3, children(l*, $\mathcal{G}$) represents flows. In the iterations of line 6, l represents a link. Correspondingly, in the iterations of line 8, f represents a flow, and in the iterations of line 10, l' represents a link. In Algorithm 5, shown in in FIG. 6B, the input received is f*, representing a flow, where the actual or desired rate of the flow may change infinitesimally. In line 6 of Algorithm 5, children(f*, $\mathcal{G}$)∪{b} represents links that are utilized by the flow f* but are not bottlenecks to the flow f*. In the iterations of line 8, these links are added to the heap structure, and are accessed subsequently in line 11. The operations in lines 10 through 20 in Algorithm 5 are similar to the operations in lines 5 through 15 in Algorithm 4.

Since each node in the bottleneck structure is visited only once, the loop in line 8 and/or line 10 can be parallelized, to enhance performance of Algorithm 4. For example, since the computations in lines 9 through 13 are performed for each child f, but using the same gradient graph $\mathcal{G}$, the computations for one or more children may be performed using one processor and the computation for one or more other children may be performed in parallel, using a different processor. In one embodiment, |children (s, $\mathcal{G}$)| distinct processors may be used, and the respective computations for all the children may be performed in parallel. In addition or in the alternative, the computations in line 11 and 12 may be performed in parallel, in a similar manner has described for the computations in lines 9 through 13.

3 Benchmarks 3.1 Dataset and Experimental Environment

To ensure the benchmarks are performed on a realistic dataset, our team was given access to a set of anonymized NetFlow logs from ESnet. ESnet is a high-performance network built to support scientific research that provides services to more than 50 research sites, including the entire US National Laboratory system, its supercomputing facilities, and its major scientific instruments.

Figure 7:
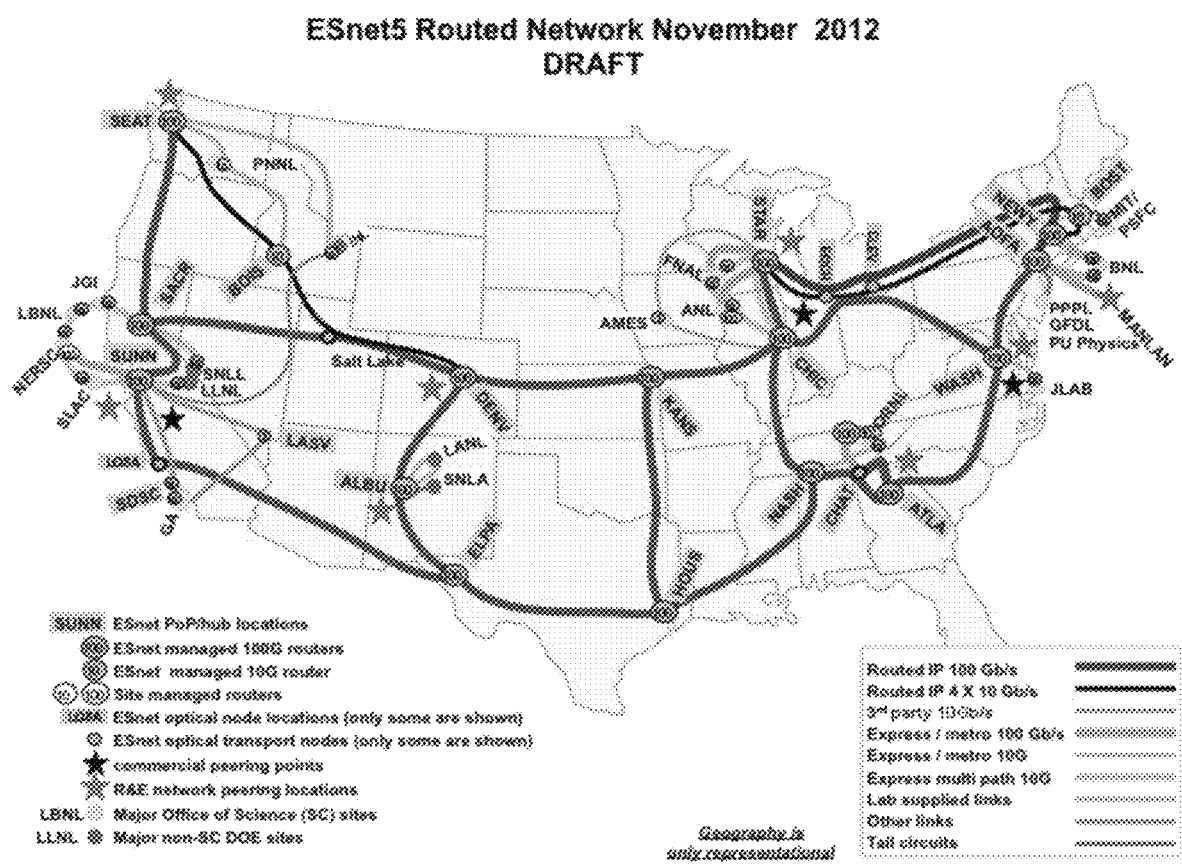
FIG. 7 depicts the topology and the ES Net network used in various experiments.

The dataset contains NetFlow logs from Feb. 1, 2013, through Feb. 7, 2013. At the time the logs were generated, ESnet had a total of 28 routers and 78 links distributed across the US. FIG. 7 depicts a view of the ESnet topology at the time the logs were captured. The dataset includes samples from all the routers, organized in intervals of 5 minutes, from 8 am through 8 pm, for a total of 1008 NetFlow logs for each router (or a total of 28224 logs across the network). The total data set is about 980 GB.

All tests were performed on an Intel Xeon E5-2683 v3 processor clocked at a rate of 2 GHz. The processor had 4 cores configured with hyperthreading disabled. L1, L2 and L3 caches had a size of 32 KB, 256 KB and 35840 KB, respectively, and the size of the RAM was 32 GB. We benchmarked three software packages we developed for computing bottleneck structures. The first is a Python package that implements the ComputeBS algorithm for computing bottleneck structures and the BruteGrad algorithm for computing link gradients. The second is a C++ package equipped with a Python interface and functions to generate the bottleneck structure graph. It implements the FastComputeBS algorithm for computing bottleneck structures and the BruteGrad$^{++}$ algorithm for calculating link gradients. The third package is also a C++ package similar to the second package, but implements the ForwardGrad algorithms for calculating link gradients.

3.2 Computing Bottleneck Structures at Scale

In this section, we benchmark and compare the two programs on the task of computing bottleneck structures. We expect the C++ package to be more efficient because it is written in a faster language and uses an asymptotically faster algorithm.

3.2.1 Runtime

Figure 8:
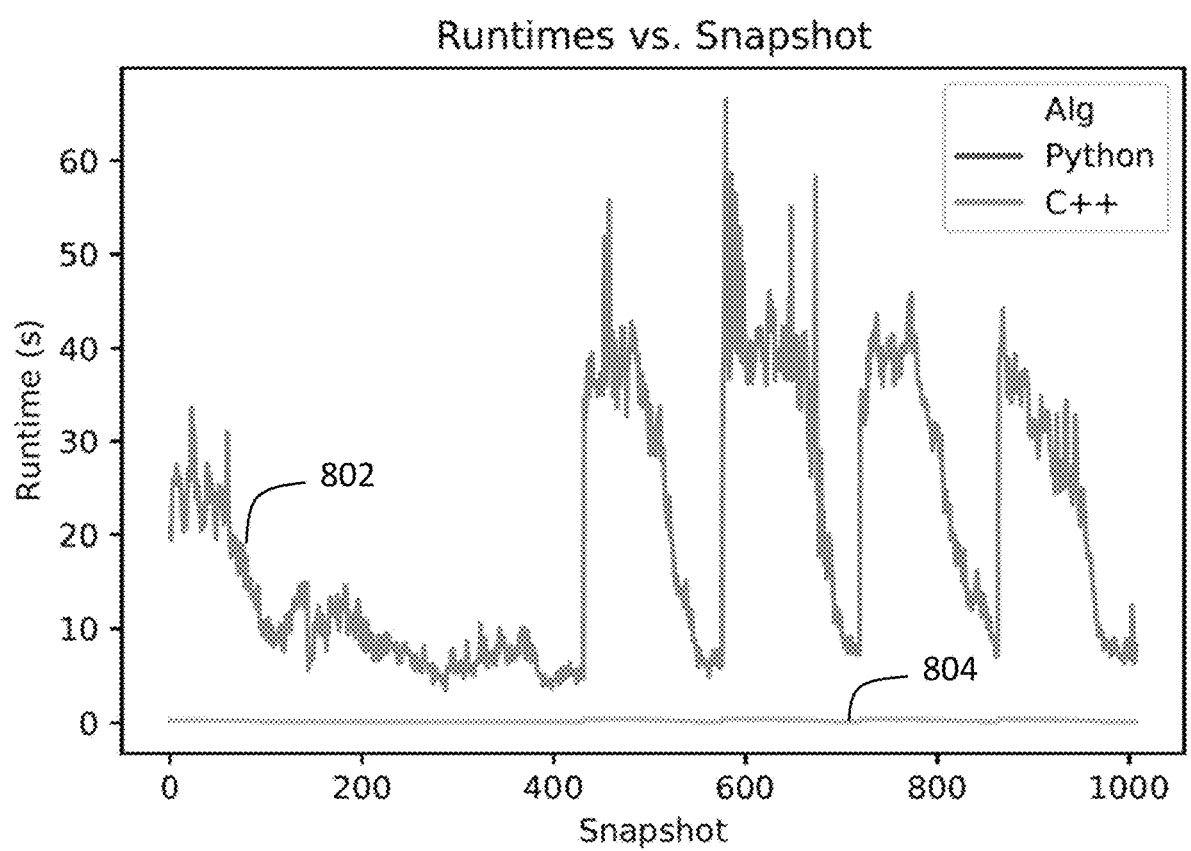
FIG. 8 shows the time taken to compute the bottleneck structure of the network shown in FIG. 7, according to two different embodiments.

FIG. 8 plots the time taken by the first two package to compute the bottleneck structure of ESnet at each of the 1008 logging snapshots. The plot 802 shows the time taken by the Python package and the plot 804 shows the time taken by the C++ package. The seven separate days on which logs were collected are clearly distinguishable, corresponding to varying levels of traffic through the network (the gaps in our logs between 8 pm and 8 am each day are not represented in the plot). As expected, the C++ package is significantly faster than the Python package. The C++ package runs in 0.21 s on average, completing each in under 0.44 s, while the Python package averages 20.4 s and takes as long as 66.5 s. On average, the C++ package performs 87 times faster at this task.

Figure 9A:
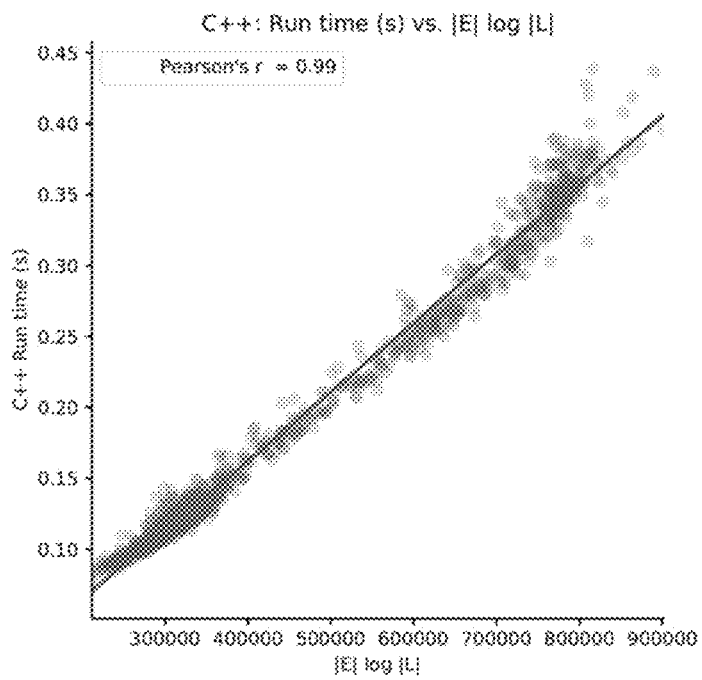
FIGS. 9A and 9B show the asymptotic run times of an embodiment of the FastComputeBS algorithm in relation to the network size and number of flows, respectively.
Figure 9B:
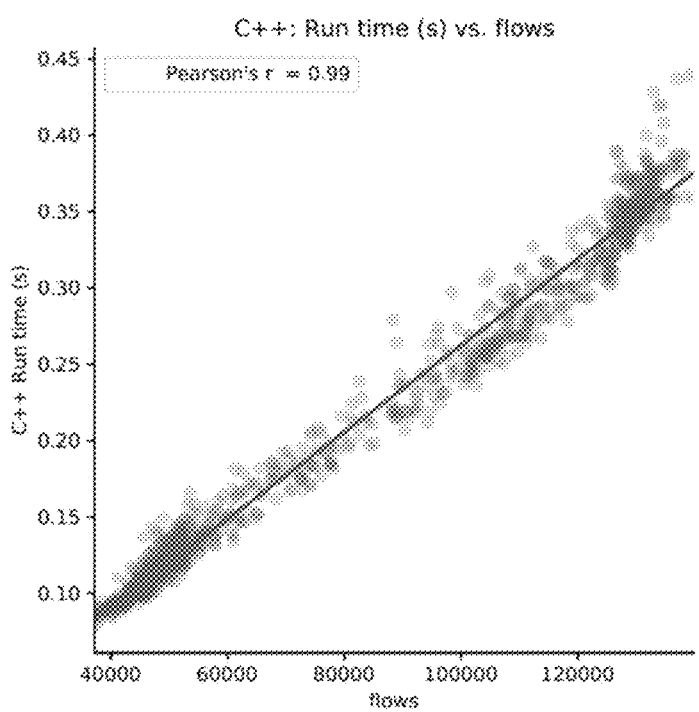

FIGS. 9A and 9B show the asymptotics of an embodiment of the FastComputeBS algorithm. FIG. 9A plots the observed run time of the C++ package against the asymptotic bound $|E||\log|\mathcal{L}|$, showing very high correlation between the two. This indicates that the asymptotic bound tightly captures the true running time of the algorithm. FIG. 9B plots the runtime of each snapshot against the number of flows $|\mathcal{F}|$ present in the network at that time, also showing strong agreement. This is because, in our experiments, the number of links is the same across all snapshots, and since each flow traverses a small number of links, $|E|$ is approximately linear in $|\mathcal{F}|$.

3.2.2 Memory Usage

Figure 10:
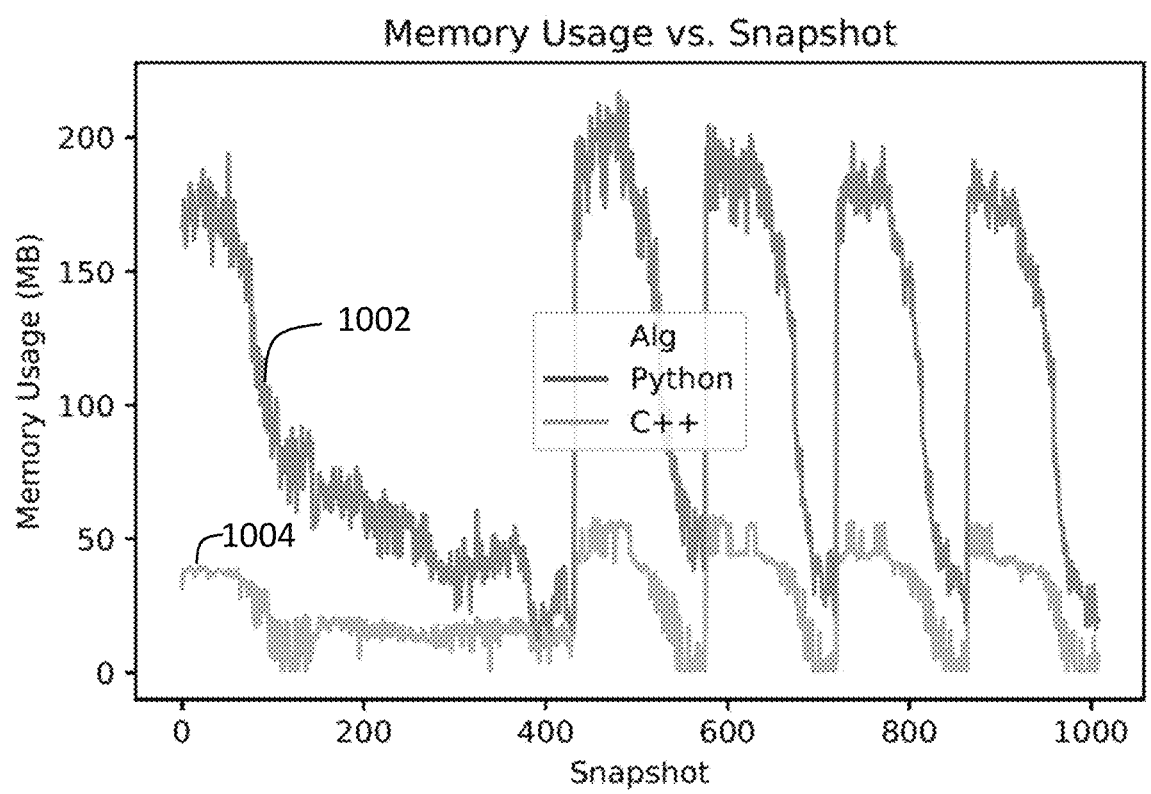
FIG. 10 shows memory usage of two different embodiments in generating the bottleneck structure shown in FIG. 8.
Figure 11:
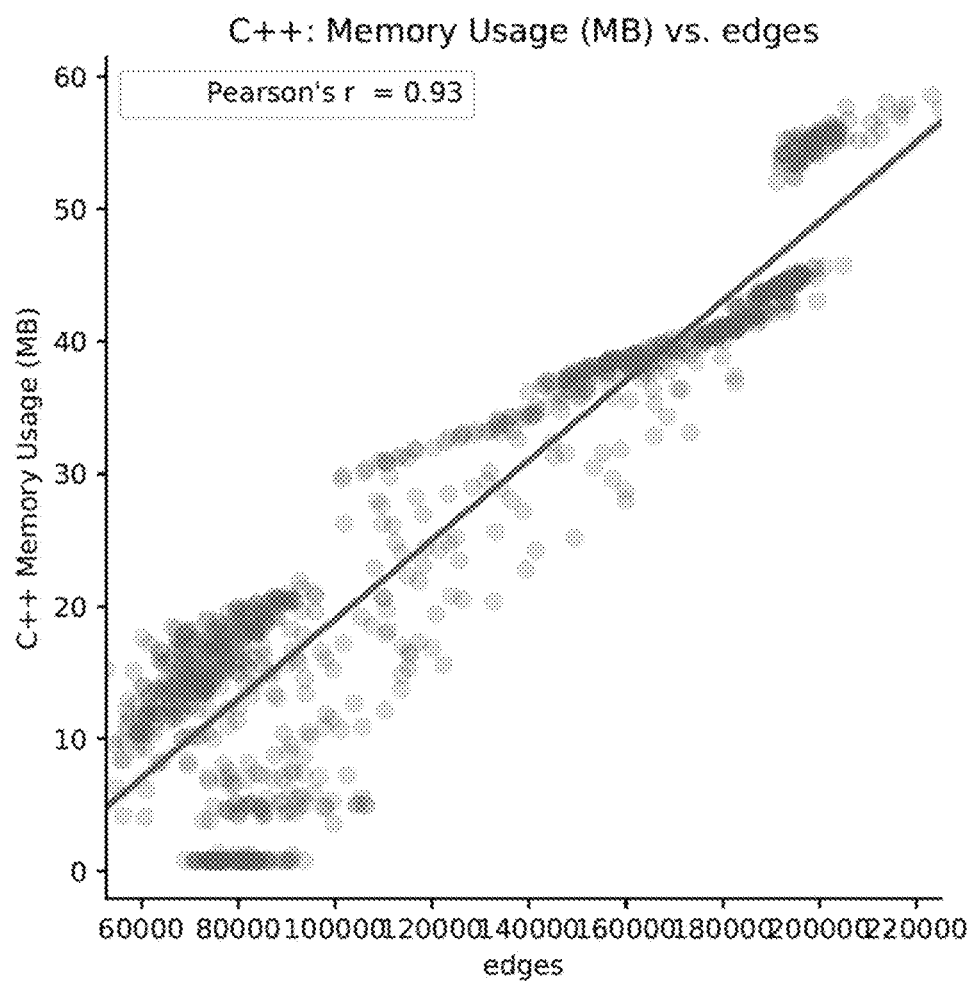
FIG. 11 shows the space complexity or the asymptotic memory usage of an embodiment of the FastComputeBS algorithm in relation to the network size.

FIG. 10 plots the amount of memory used by the first two packages when computing the bottleneck structure of ESnet at each of the 1008 logging snapshots. In particular, plot 1002 shows instantaneous memory usage by the Python package and the plot 1004 shows the instantaneous memory usage by the C++ package. Both procedures build a directed graph with the same numbers of vertices and edges and, as such, the final memory consumptions by both packages is about the same. However, as FIG. 10 shows, the C++ package is far more efficient, using only 26.7 MB of memory on average. This represents a 4× median improvement over the Python package, because its instantaneous memory usage can exceed 200 MB. FIG. 11 demonstrates the space complexity of the FastComputeBS algorithm, showing that the amount of memory it uses is linear in the size of the input network.

3.3 Computing Link Gradients at Scale

In this section, we benchmark and compare the two programs' functionality for computing link gradients. We consider three methods in all: the Python package's BruteGrad, the C++ package's BruteGrad$^{++}$, and ForwardGrad, implemented and provided in the third (C++) package. This allows us to separate the effect of using a faster algorithm from the effect of using a faster programming language. We consider one snapshot per hour over twelve hours. For each snapshot, we compute the derivative of the network's total throughput with respect to each of its links using each of the three algorithms.

3.3.1 Runtime

Figure 12:
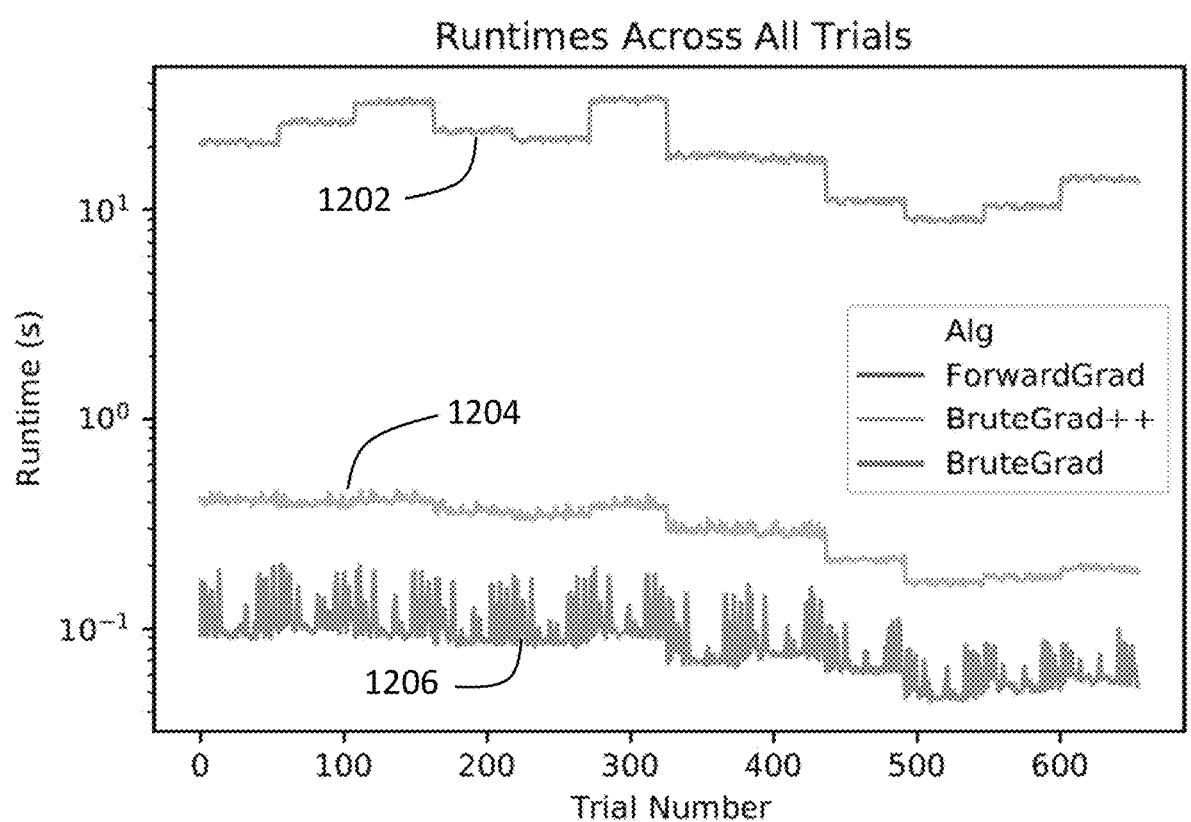
FIG. 12 shows the time taken to compute a derivative, a change in throughput in response to an infinitesimal change in the capacity of a link, for the network shown in FIG. 7, according to three different embodiments.

FIG. 12 shows the runtime of each algorithm across all the links and snapshots on a log scale. The 12 different snapshots form discernible sections, since the state of the network remains constant throughout all trials within each snapshot. Plots 1202, 1204, and 1206 show the runtimes, respectively, of Python implementation of BruteGrad, C++ implementation of BruteGrad$^{++}$, and C++ implementation of ForwardGrad. Derivatives, change in network throughput in response to an infinitesimal change in the capacity of a network link, were computed across 655 trials from 12 snapshots of the ESNet network.

Changing from the Python package's BruteGrad to the C++ package's BruteGrad$^{++}$ reduces the average runtime from 19.9 s to 0.30 s, a 66-fold improvement. Notice that this is approximately the same improvement observed when moving from Python's ComputeBS to C++'s FastComputeBS, since these algorithms are used as subroutines by BruteGrad and BruteGrad$^{++}$. Changing to the C++ package's ForwardGrad algorithm further reduces the runtime to 0.09 s, a further 3.5-fold improvement. This level of performance makes it possible to compute a large number of derivatives in real time to respond to rapidly changing network conditions.

As discussed in Section 2.4, when ForwardGrad is used to compute a link derivative, the runtime is linear in the number of flows and links that are affected by the given link. This group, which we call the link's "region of influence," is simply the descendants of the link in the bottleneck structure graph. In contrast, the run times of the BruteGrad and BruteGrad$^{++}$ algorithms depend on the size of the entire network, since they reconstruct the whole bottleneck structure. In ForwardGrad in rare cases, a single flow may be bottlenecked simultaneously at multiple links. In this case, the siblings of a link's descendants may also be part of the region of influence, even if they are not themselves descendants of the given link. We observe no such cases in our experiments.

Figure 13A:
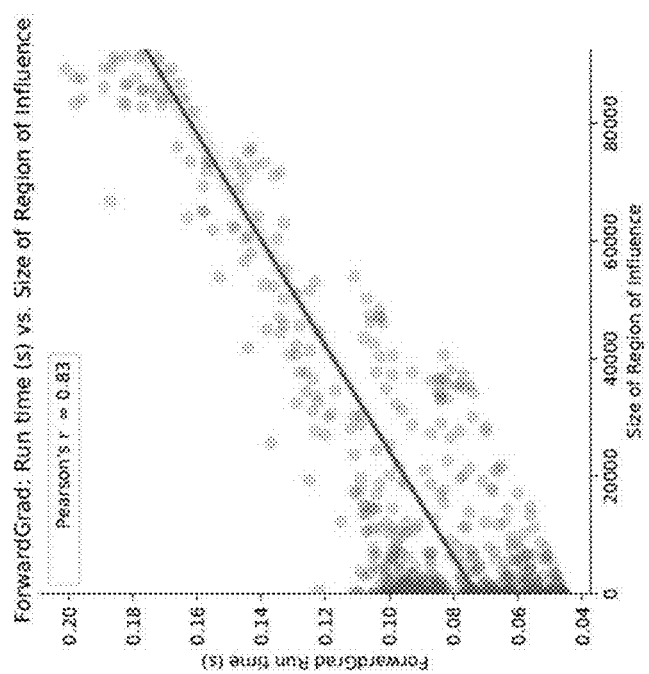
FIGS. 13A-13F plot the runtimes of the three algorithms, according to three respective embodiments, against the size of the given link's region of influence and against the total number of flows in the network.
Figure 13B:
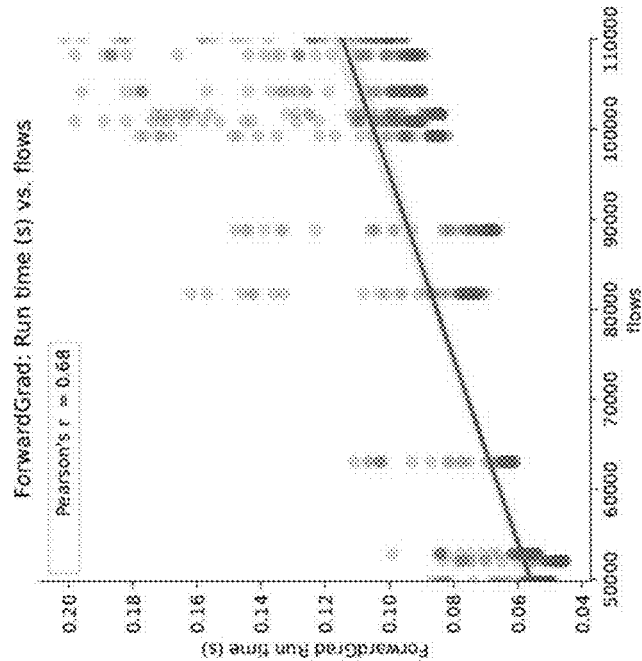
Figure 13D:
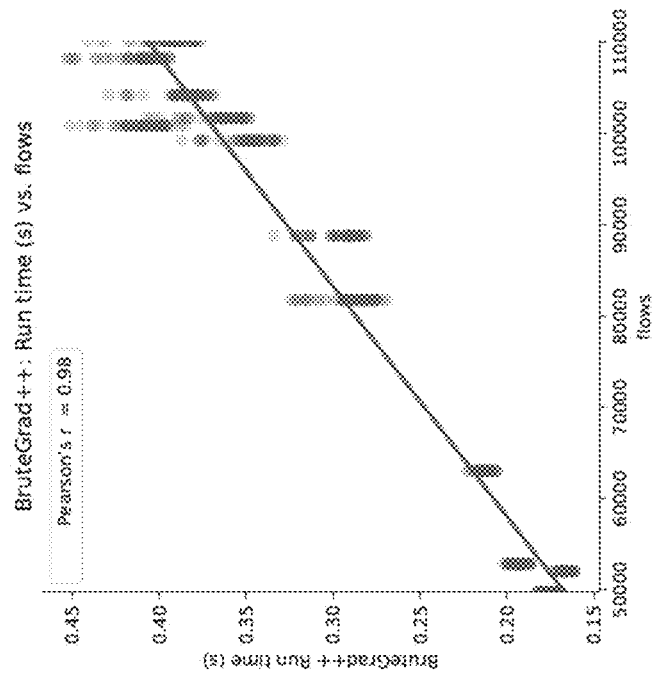
Figure 13C:
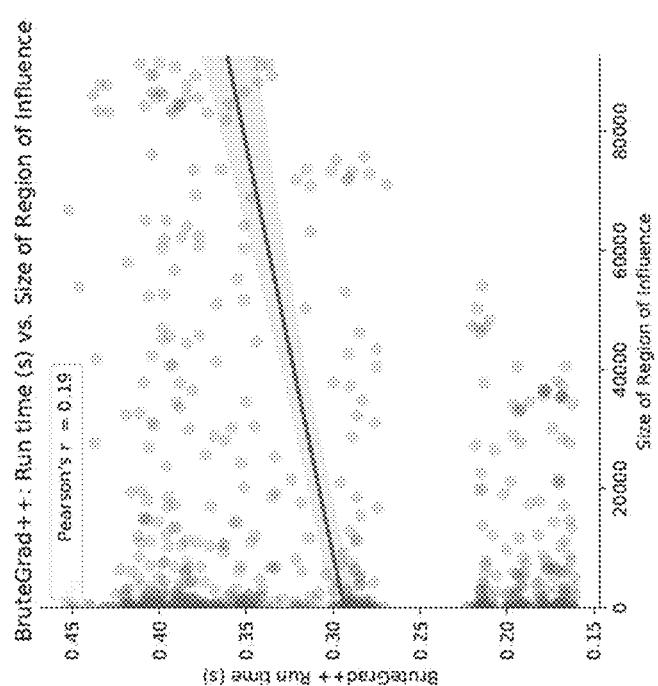
Figures 13E, 13F:
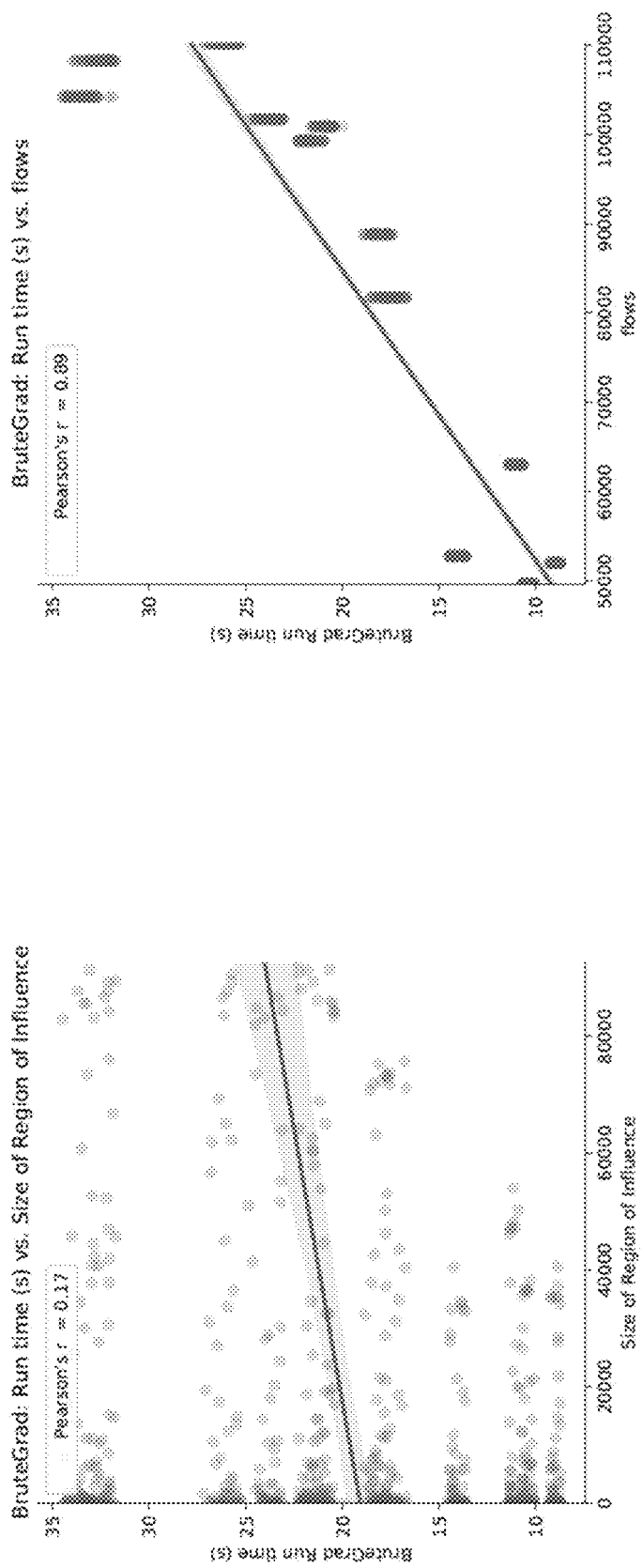

FIGS. 13A-13F plot the runtimes of the three algorithms, according to three respective embodiments (the three software packages) against the size of the given link's region of influence and against the total number of flows in the network. As expected, ForwardGrad is highly correlated with the former (FIG. 13A). It is also somewhat correlated with the number of flows (FIG. 13B), but only because networks with many flows also tend to have some links with many descendants. Even in these large networks however, the runtime falls under the line of best fit for most links. As FIGS. 13C and 13E show, the runtimes of BruteGrad$^{++}$ and BruteGrad are not well explained by the size of the region of influence. Instead, like FastComputeBS and ComputeBS, as shown in FIGS. 13D and 13F, they are linearly dependent on the size of the network. ForwardGrad's runtime is generally linear in the size of the region of influence, while BruteGrad and BruteGrad$^{++}$ grow with the size of the network as a whole.

Figure 14:
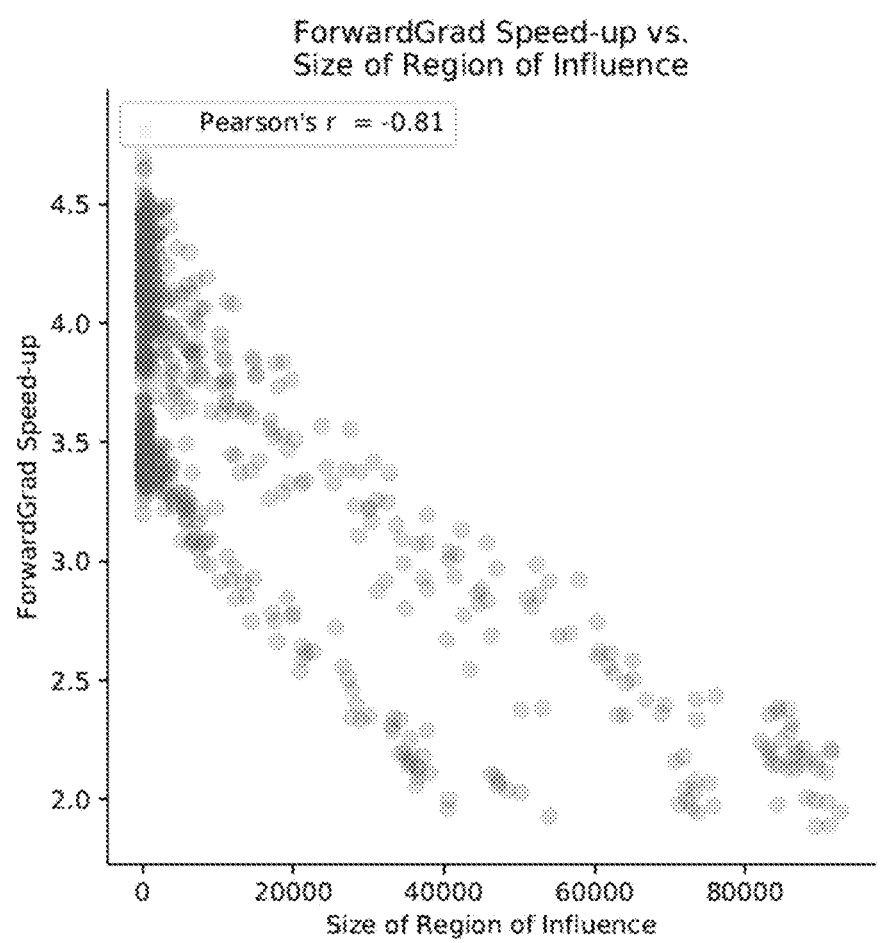
FIG. 14 shows the speed-up in an embodiment of ForwardGrad compared to and embodiment of BruteGrad$^{++}$, in relation to a link's region of influence.

Given their time complexities, ForwardGrad is expected to exhibit a larger speed-up compared to BruteGrad$^{++}$ in cases when the input link has a small region of influence. FIG. 14 plots this relationship, where the speed-up factor is obtained by replacing BruteGrad$^{++}$ with ForwardGrad, and shows that the speed-up factor grows as the size of the region of influence approaches 0. This is because the size of region of influence shrinks in comparison to the network as a whole. Thus, the 3.5× average speed-up observed in our experiments would keep increasing as the algorithms are applied to larger and larger networks. In some embodiments, a further speed-up can be attained by parallelized execution of ForwardGrad, as described above.

3.3.2 Memory Usage

Figure 15:
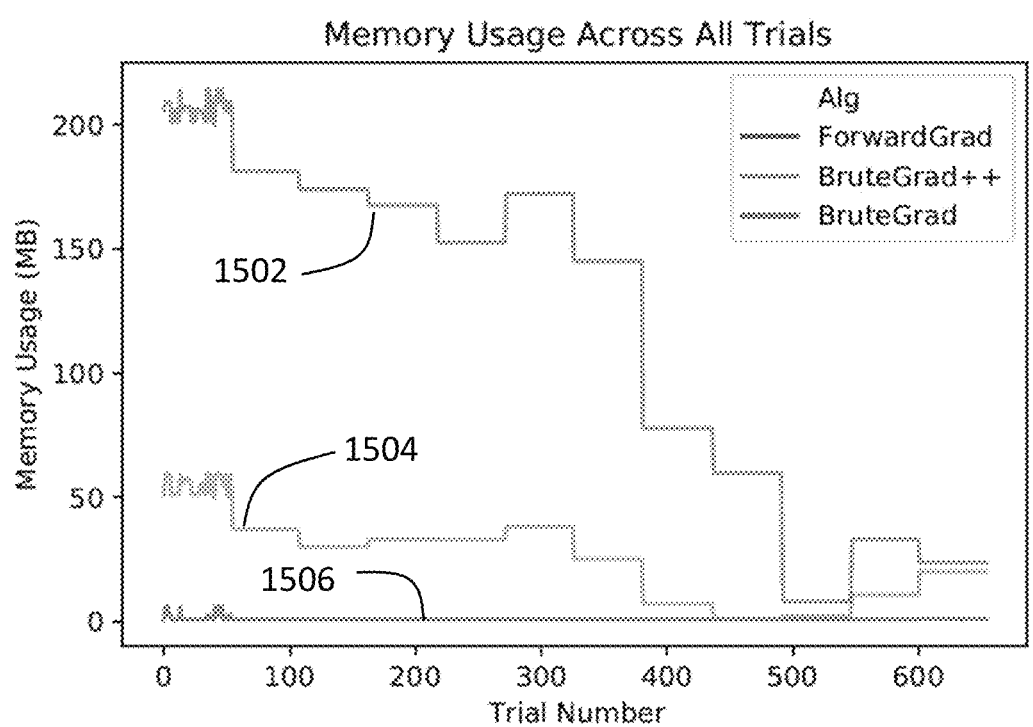
FIG. 15 shows memory usage of three different embodiments in computing a derivative, a change in throughput in response to an infinitesimal change in the capacity of a link, for the network shown in FIG. 7.

We profile the algorithms based on the amount of additional memory they need to compute each derivative given a pre-constructed bottleneck structure. In FIG. 15, traces 1502, 1504, and 1506 show, respectively, the instantaneous memory usages for a Python implementation of BruteGrad, a C++ implementation of BruteGrad$^{++}$, and a C++ implementation of ForwardGrad. FIG. 15 shows that replacing the Python package's BruteGrad with BruteGrad$^{++}$ significantly reduces the memory usage—by a factor of 10 on average. Replacing BruteGrad$^{++}$ with ForwardGrad has an even greater impact, reducing memory usage by a factor of 30 on average. Indeed, the average amount of additional memory used by ForwardGrad across all trials was just 850 KB, and the maximum was 6.4 MB. The steep decline in memory usage observed in the later trials reflects the fact that the number of flows in the network decreased precipitously at the end of the day.

Figure 16A:
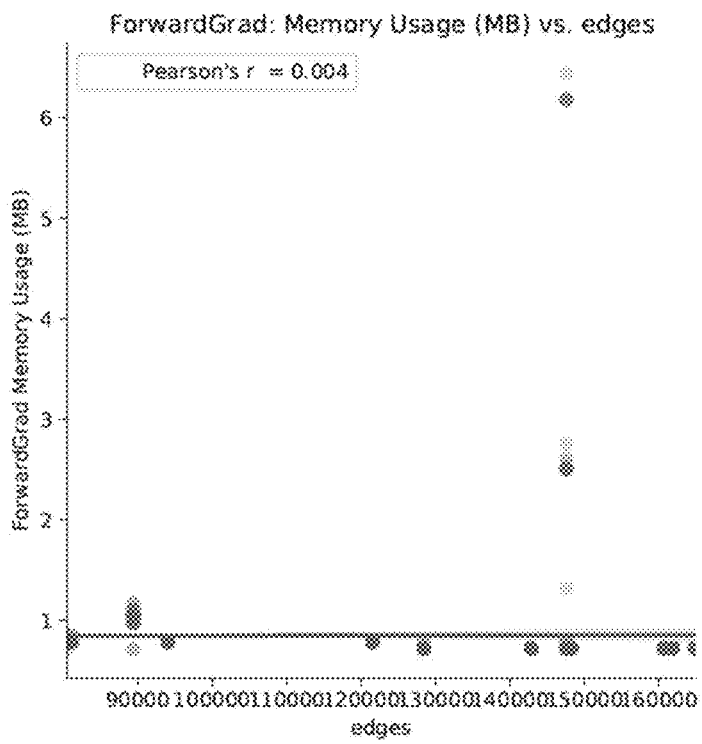
FIGS. 16A and 16B show the asymptotic behavior of an embodiment of ForwardGrad' memory usage in computing the derivarive described in connection with FIG. 15.
Figure 16B:
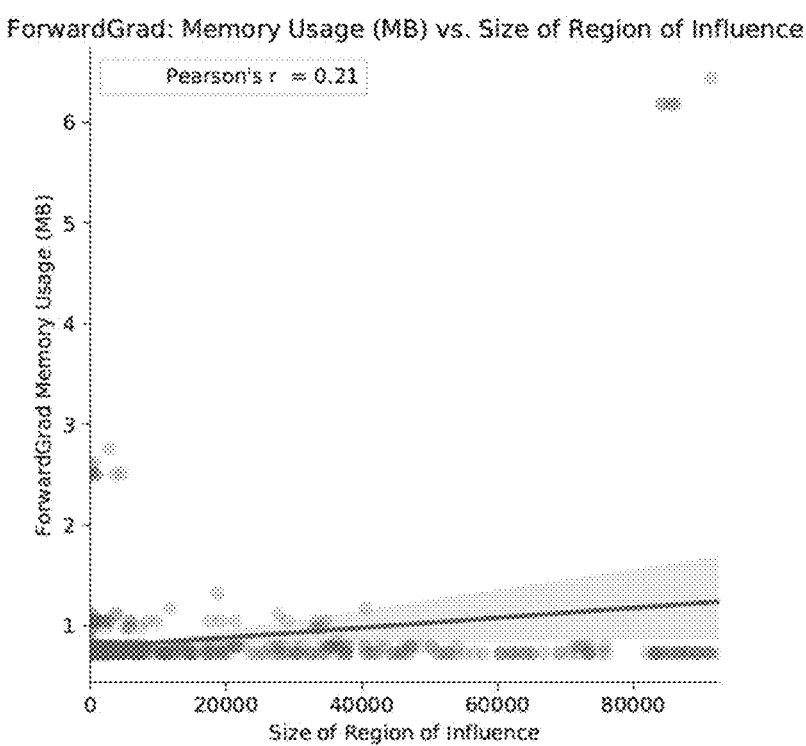

FIGS. 16A and 16B show the asymptotic behavior of an embodiment (the third software package) ForwardGrad' memory usage. Unlike the other algorithms, ForwardGrad does not use more memory as the network size increases, as FIG. 16A shows. In general, ForwardGrad's memory usage does not grow with the size of the network. Technically, the space-complexity of ForwardGrad is linear in the size of the region of influence, as FIG. 16B shows, since ForwardGrad stores a derivative value for each element in that set. In our experiments however, we find that this dependence is so weak as to make the memory usage almost constant. As shown in FIG. 16B, if we only consider trials in the middle 99% by memory usage, to exclude outliers, then the correlation shrinks to 0.06. These experiments demonstrate that the ForwardGrad algorithm is highly scalable and space-efficient.

5 Using FastComputeBS and ForwardGrad in Production Networks

The algorithms described herein were developed as part of the GradientGraph (G2) technology. G2 is a network optimization software package that leverages the analytical power of bottleneck structures to enable high-precision bottleneck and flow performance analysis. Network operators can use G2 to address a variety of network optimization problems, including traffic engineering, congestion control, routing, capacity planning, network design, and resiliency analysis, among others.

The G2 technology includes three layers: the core analytical layer, the user interface (northbound API) and the network interface (southbound API). Various embodiments of the core analytical layer construct the bottleneck structure of the network (a system in general) under study using FastComputeBS and uses algorithms such as ForwardGrad (among others from the Theory of Bottleneck Structures) to analyze performance. Then, G2 provides network (system) operators with both online and offline recommendations on how to configure the network (system) to achieve better performance. Online recommendations address traffic engineering problems and include actions such as changing the route of a set of flows or traffic shaping certain flows to improve overall system performance. Offline recommendations address capacity planning and network design problems and include actions such as picking the optimal link to upgrade or identifying the most cost-effective allocation of link capacities (for instance, identifying optimal bandwidth tapering configurations in data center networks).

Various embodiments of the user interface (northbound API) generally provide three mechanisms to interact with G2's core analytical engine: a representational state transfer (REST) API to enable interactive and automated queries, a graphical user interface (GUI) that allows operators to visualize bottleneck structures and gradients, and a command line interface (CLI).

Various embodiments of the network interface (southbound API) provide a set of plugins that allow for convenient integration of G2 into production networks. These plugins can read logs from flow monitoring protocols such as NetFlow, sFlow, or SNMP. The sets of links $\mathcal{L}$ and active flows in the network $\mathcal{F}$ can be easily reconstructed if such a monitoring protocol is enabled in all (or at least in several) of the routers and switches of the network. Otherwise, links and flows can be reconstructed with additional information extracted from SNMP (to learn the network topology) and from routing tables (to infer flow path information). The capacity parameters $\{c_l, \forall l \in \mathcal{L}\}$ can be obtained from SNMP or static network topology files that production networks typically maintain. Some embodiments of G2's southbound API include plugins for all of these standard protocols to enable its integration with production networks.

5 Application to Complex Systems

While the discussion above is presented in the context of computer networks, this is only for the sake of convenience. In general, bottlenecks and bottleneck structures can exist in any system that can be modeled as a network, with multiple demand sources (also called users) looking to share resources through the network, and some objective of fairness. The demand sources correspond to "flows" in the discussion above. A bottleneck can be described as limiting the performance achieved by those demand sources in some manner due to limited availability of resources. The Theory of Bottleneck described herein and in the '862 application, and the ComputeBS, FastComputeBS, and ForwardGrad algorithms can be used to analyze and/or optimize such systems, as described below.

A system, in general, can be represented as a set of resources and users of those resources. Accordingly, a bottleneck structure is generally based on two types of elements: resource elements and user elements. The parameter(s) of the resource elements indicate the corresponding properties of resources of the system, such as link capacity, processing capacity (e.g., in million instructions per second (MIPS), floating-point operations per second (FLOPS), etc.), storage capacity, etc. The parameter(s) of the user elements indicate the corresponding properties of users of the system, i.e., these parameters generally quantify consumption of system resources (e.g., processing load of a task/computation, energy/power consumption, memory consumption, consumption of raw materials used in manufacturing, etc.

A resource element can be characterized as a negative user element, and vice versa. A change in a system can then be described using the propagation rules/equations of the resource and/or user elements. Specifically, the propagation rule/equation for a resource element l can be stated as:

$$\Delta_l = -\sum_{f \in P_l} \Delta_f / |S_l|$$

where:

$\Delta_l$ is resource l's drift (a change in a resource parameter of a system resource represented by the resource element l. For convenience, that resource may be referred to as resource l);

$P_l$ is a set of users using the resource l. In some cases, $P_l$ only includes the users that are not bottlenecked due to resource l;

$\Delta_f$ is user f's drift (a change in a utilization parameter of a system user represented by the user element f. For convenience, that user may be referred to as user f); and $S_l$ is a set of users bottlenecked by the resource l, i.e., $|S_l|$ is the number of users bottlenecked by the resource l The propagation rule/equation for a user element f can be stated as:

$$\Delta f = \min_{l \in P_f} \Delta_l$$

where $P_f$ is a set of resources due to which the user f is bottlenecked.

Typically, a system would have several different resources, operating in some relation to one another that can be represented by a network. For example, a hydro-electric power station may have electricity generators, transformers, automated valves and a network of conduits, and computers to control the operation of these, where the resources correspond to nodes of the network model, and the relations (flow from one to another) are edges of the network model. The operation of any of these would be impacted by factors such as scheduled maintenance of these components and unexpected faults in or failure of one of more components. Some factors that are beyond a system operators control can also impact the operation, e.g., required usage, of one or more system components. Examples of such factors include the precipitation and the water level in the reservoir from which the power station operates, average temperature in a region where the electricity is delivered, impacting the demand for electricity, availability of other generators on the electricity grid, etc.

Any one of these factors can create a bottleneck (or, conversely, insufficient utilization of a system resource). For example, an offline generator, transformer, or a conduit, can increase the load on one or more other generators. Uneven demands for electricity can cause an imbalance in the respective loads of one or more generators and/or transformers.

In the data networks described above, link capacity is a type of resource, where the different links are different resources, and the different network flows are the different users of these resources. In the hydro-electric power system, the different system components are the different resources, where the system includes different types of resources, as noted above. The electricity demands from different regions and/or consumers, or the electricity loads, are the different users of the system resources. A change in the availability and/or capacity of a resource and/or a change in a load can create a bottleneck. Moreover, the bottleneck can propagate through the system impacting other system resources and/or loads. As such, the techniques described herein can be used to analyze the bottlenecks and their propagation in the hydro-electric power system in an efficient manner, to serve the diverse demand sources in with some fairness criteria, and how that demand propagates through the components in relation to one another, as modeled in a network manner.

This analysis can also be used to manage system resources, for example, to adjust water flows, to bring generators online and to take them offline, etc., and/or to inform other grid operators the total and/or peaks loads that can be provisioned by the generation system, to optimize overall system objectives of performance, in terms of how the demand sources (users) are being served.

Figure 17:
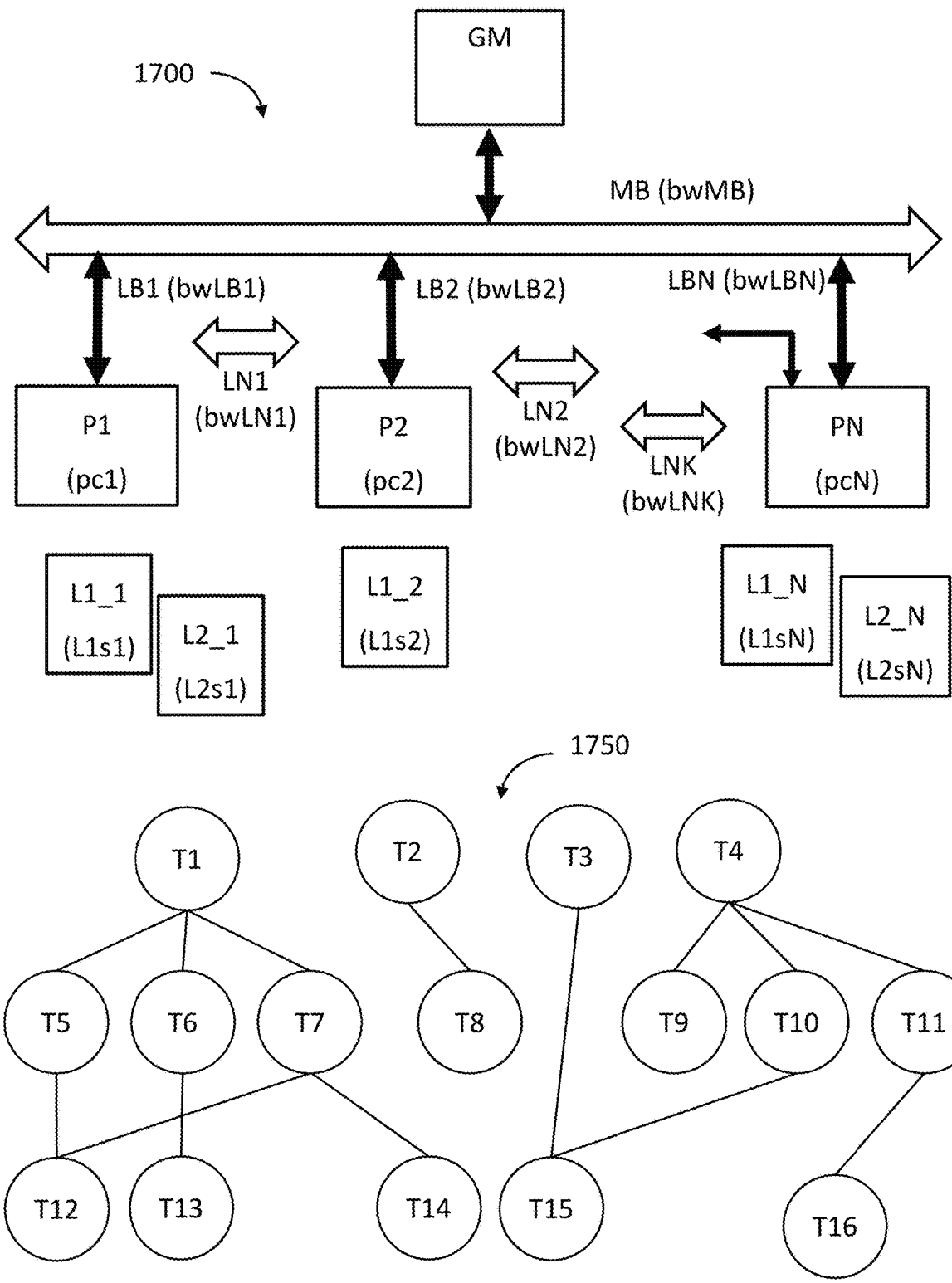
FIG. 17 schematically depicts a heterogeneous computing system that can be analyzed using various embodiments of algorithms for computing the bottleneck structure and derivatives of a system.

With reference to FIG. 17, another example of a system where the techniques described herein can be applied is a heterogeneous computing system 1700. Such a system, in general, includes heterogeneous processors P1, P2, . . . , PN, i.e., several processors of several different types, such as graphics-processors, vector processors, general-purpose processors, multi-core processors, processors operating at different clock speeds, specialized processors such as math co-processors, signal-processing units, etc. One or more of these processors may include local cache memory. For example, processors P1 and PN include two levels of local cache L1 and L2. Processor P2 includes only one level of cache memory L1. These processors may communicate with each other via a main bus MB, where a particular processor is coupled to the main bus via a local bus LB1, LB2, . . . , LBN, etc. In addition, one or more processors may be locally connected via a local network such as LN1, LN2, . . . , LNK to one or more other processors. The local networks may connect the processors directly or via routers, but without relying on the main bus.

System 1700 thus includes several resources of different kinds such as processors, cache memory, local networks and buses, and a main bus. These resources have associated parameters. For example, for a processor a processing capacity may be expressed in MIPS. In some cases, a single processor may have different processing capacities depending on the operating frequency used, if frequency throttling is employed. Cache memory parameters may include cache size and latency. The parameters of a local network, a local bus, and the main bus may include bandwidth(s) and/or one or more communication latencies.

FIG. 17 also depicts a set of tasks 1750 that includes tasks T1 through T16 and that may be executed using the system 1700. It should be understood that the set of tasks 1700 is illustrative only and that, in general, any number of tasks (e.g., a few, tens, hundreds, thousands, or even more tasks) may be executed using a system such as the system 1700. As shown in the set of tasks 1750, there may be no dependence between certain tasks and, as such, they may be executed in parallel on different processors. Some tasks may be interdependent and, as such may be executed sequentially. In the system 1700, the various tasks are the users of the system resources. The tasks may also have associated parameters such as a maximum completion time, the latest start time, amount of data shared between one or more tasks, power/energy budget, etc.

In the system 1700, the value of a resource and/or user parameter and/or a change in the value of such a parameter can create a bottleneck that can propagate through the system, impacting other resources and users. Embodiments of the ComputeBS, FastComputeBS, and ForwardGrad algorithms described herein can be used to analyze such bottlenecks and changes in resource or user parameters in an efficient manner. Moreover, this analysis can be used for designing and/or optimizing the system. For example, the set of tasks can be analyzed to determine the number of processors to be used, the types of processors to be used, the bandwidth of one or more networks to be provisioned, the sizes or one or more memories to be allocated for the computation of the tasks. These design choices can significant improve the operation of the computing system 1700, e.g., in terms of processor and/or memory utilization, minimization of the required processing and/or memory capacity, minimizing energy and/or power consumption, and/or maximizing performance by minimizing the computation time(s). Conversely, the resource parameters may be treated as constraints to determine the achievable task parameters, such as, e.g., the worst-case completion time.

Other examples of systems where bottlenecks can occur and can be analyzed and the system and/or its use can be optimized include, but are not limited to: transportation systems for passengers and cargo; distribution systems such as those for oil, gas, and natural gas; domestic and industrial water supply and irrigation systems; storage systems, having different types of storage units such as cache memories, solid-state drives, hard disks, optical discs, etc., and communication links having different and/or adjustable bandwidths for interconnecting several storage units with one or more processing units; biological systems, where materials are consumed and transformed into other materials by one type of components, and the transformed materials are supplied to a another to another type of components, for consumption thereof and/or further transformation; etc.

Embodiments of the algorithms described herein can apply not just to wired networks but also to networks that combine wired and wireless networks, where link capacities might include spatial and band constraints that limit the link capacity. Furthermore, in a system represented as a network, a link need not be a data link. Rather, the link may involve communication or movement of physical objects. What distinguishes the application of embodiments of the algorithms described herein from general flow maximization, a well-known and long standing area of operations research, is when such systems have competing demand source (or users, tasks) that have to divide some resources of the system fairly, to some measure of fairness (e.g., max-min) while maximizing performance objectives, through a network model.

6 Conclusion

In various embodiments, the techniques described herein demonstrate practical applications of the Theory of Bottleneck Structures to production networks and other systems. In a series of experiments on the ESnet network, we show that our new software package far outperforms other techniques on the core operations of computing bottleneck structure graphs and computing link gradients. We also show that our FastComputeBS and ForwardGrad algorithms are highly scalable in both time and space complexity. FastCompute is shown to scale quasilinearly with the size of the network (system, in general), and ForwardGrad is shown to scale linearly with the size of the region of influence.

These results demonstrate that bottleneck structure analysis is a practical tool for analyzing production networks and complex systems. The benchmarks indicate that our package can analyze networks that are even larger than ESnet and do so in real time, even as network conditions are changing rapidly. This is also true in the case of analysis of large systems, such as those described above. The efficiency of our core algorithms enables them to be used as subroutines in larger network/system optimization toolchains. The advances presented herein may unlock the potential of bottleneck structure analysis for myriad important applications.

In summary, the Theory of Bottleneck Structures is a recently-developed framework for studying the performance of data networks. It describes how local perturbations in one part of the network propagate and interact with others. This framework is a powerful analytical tool that allows network operators to make accurate predictions about network behavior and thereby optimize performance. We introduce the first software package capable of scaling bottleneck structure analysis to production-size networks and other systems. We benchmark our system using logs from ESnet, the Department of Energy's high-performance data network that connects research institutions in the U.S. Using the previously published tool as a baseline, we demonstrate that our system achieves vastly improved performance, constructing the bottleneck structure graphs in 0.21 s and calculating link derivatives in 0.09 s on average.

We also study the asymptotic complexity of our core algorithms, demonstrating good scaling properties and strong agreement with theoretical bounds. These results indicate that our new software package can maintain its fast performance when applied to even larger networks. They also show that our software is efficient enough to analyze rapidly changing networks in real time. Overall, we demonstrate the feasibility of applying bottleneck structure analysis to solve practical problems in large, real-world data networks and in other systems.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices other than what is specifically described, and are to be interpreted as broadly as allowed under the law.

What is claimed is:

1. A method for determining a change in a first system parameter in response to an incremental change in a second system parameter, the method comprising performing by a processor the steps of:
    generating a bottleneck structure representing the system, the bottleneck structure:
        comprising a plurality of elements, each element representing a respective system resource or a respective user of one or more system resources; and
        having a plurality of levels, respective elements at successive levels indicating increasing resource utilization, resource availability, or resource requirements;
    receiving an element identifier identifying one of the plurality of elements;
    selecting elements that are directly impacted by a change in a parameter associated with the identified element, and determining, for each selected element, a respective initial incremental change in a respective associated parameter;
    recursively propagating the respective initial incremental changes through the bottleneck structure; and
    deriving a change in the first system parameter by accumulating respective changes in respective parameters associated with elements of a specified type of the bottleneck structure.

2. The method of claim 1, wherein the plurality of elements comprises:
    one or more resource elements, wherein a resource element represents a resource parameter of a corresponding system resource; and one or more user elements, wherein a user element represents a utilization parameter of a corresponding user of the system.

3. The method of claim 1, wherein the parameter associated with the identified element comprises resource utilization, resource availability, or resource requirements.

4. The method of claim 1, wherein the parameter associated with one of the selected elements comprises resource utilization, resource availability, or resource requirements.

5. The method of claim 1, wherein the identified element comprises a resource element or a user element.

6. The method of claim 1, wherein the directly impacted elements comprise resource elements or user elements.

7. The method of claim 1, wherein the plurality of elements comprises:
one or more resource elements of a first type, wherein a resource element of the first type represents a resource parameter of a corresponding system resource of the first type; and
one or more resource elements of a second type, wherein a resource element of the second type represents a resource parameter of a corresponding system resource of the second type.

8. The method of claim 1, wherein:
the plurality of elements comprises:
one or more link elements corresponding, respectively, to one or more links in a network; and
one or more flow elements corresponding, respectively, to one or more network flows;
flow elements at a first level correspond to flows having smaller flow rates than rates of flows corresponding to flow elements at a second level;
the element identifier identifies a link element; and
the first system parameter comprises total network flow throughput.

9. The method of claim 1, wherein the step of recursively propagating the respective initial incremental changes through the bottleneck structure comprises:
propagating a first initial incremental change through the bottleneck structure at a first processor; and
propagating in parallel a second initial incremental change through the bottleneck structure at a second processor.

10. The method of claim 1, wherein the step of recursively propagating the respective initial incremental changes through the bottleneck structure comprises applying a propagation rule corresponding to a type of the selected elements.

11. The method of claim 1, wherein the step of recursively propagating comprises storing in a heap structure identifiers of one or more of the plurality of elements.

12. The method of claim 11, wherein:
the heap structure comprises a two-key heap structure, wherein:
a first key represents a base value of a parameter associated with an element of the bottleneck structure; and
a second key represents a increment to the base value, the increment being positive, zero, or negative.

13. A computing apparatus for determining a change in a first system parameter of a system in response to an incremental change in a second system parameter, the computing apparatus comprising:
a first processor; and
a first memory in electrical communication with the first processor, and comprising instructions that, when executed by a processing unit that comprises one or more computing units, wherein one of the one or more computing units comprises the first processor or a second processor, and wherein the processing unit is in electronic communication with a memory module that comprises the first memory or a second memory, program the processing unit to:
generate a bottleneck structure representing the system, the bottleneck structure:
comprising a plurality of elements, each element representing a respective system resource or a respective user of one or more system resources; and
having a plurality of levels, respective elements at successive levels indicating increasing resource utilization, resource availability, or resource requirements;
receive an element identifier identifying one of the plurality of elements;
select elements that are directly impacted by a change in a parameter associated with the identified element, and determine, for each selected element, a respective initial incremental change in a respective associated parameter;
propagate recursively the respective initial incremental changes through the bottleneck structure; and
derive a change in the first system parameter by accumulating respective changes in respective parameters associated with elements of a specified type of the bottleneck structure.

14. The computing apparatus of claim 13, wherein the plurality of elements comprises:
one or more resource elements, wherein a resource element represents a resource parameter of a corresponding system resource; and
one or more user elements, wherein a user element represents a utilization parameter of a corresponding user of the system.

15. The computing apparatus of claim 13, wherein the parameter associated with the identified element comprises resource utilization, resource availability, or resource requirements.

16. The computing apparatus of claim 13, wherein the parameter associated with one of the selected elements comprises resource utilization, resource availability, or resource requirements.

17. The computing apparatus of claim 13, wherein the identified element comprises a resource element or a user element.

18. The computing apparatus of claim 13, wherein the directly impacted elements comprise resource elements or user elements.

19. The computing apparatus of claim 13, wherein the plurality of elements comprises:
one or more resource elements of a first type, wherein a resource element of the first type represents a resource parameter of a corresponding system resource of the first type; and
one or more resource elements of a second type, wherein a resource element of the second type represents a resource parameter of a corresponding system resource of the second type.

20. The computing apparatus of claim 13, wherein:
the plurality of elements comprises:
one or more link elements corresponding, respectively, to one or more links in a network; and
one or more flow elements corresponding, respectively, to one or more network flows;

flow elements at a first level correspond to flows having smaller flow rates than rates of flows corresponding to flow elements at a second level;

the element identifier identifies a link element; and the first system parameter comprises total network flow throughput.

21. The computing apparatus of claim 13, wherein:

the processing unit comprises a first computing unit and a second computing unit; and to propagate recursively the respective initial incremental changes through the bottleneck structure, the instructions program the processing unit to:

propagate a first initial incremental change through the bottleneck structure using the first computing unit; and propagate, in parallel, a second initial incremental change through the bottleneck structure using the second computing unit.

22. The computing apparatus of claim 13, wherein to propagate recursively the instructions program the processing unit to store in a heap structure identifiers of one or more of the plurality of elements.

23. The computing apparatus of claim 22, wherein:

the heap structure comprises a two-key heap structure, wherein:

a first key represents a base value of a parameter associated with an element of the bottleneck structure; and a second key represents a increment to the base value, the increment being positive, zero, or negative.

24. The computing apparatus of claim 13, wherein to propagate recursively the respective initial incremental changes through the bottleneck structure, the instructions program the processing unit to apply a propagation rule corresponding to a type of the selected elements.

* * * * *